(No Model.)
A. A. BALDWIN.
GALVANIC BELT.
No. 254,789. Patented Mar. 14, 1882.
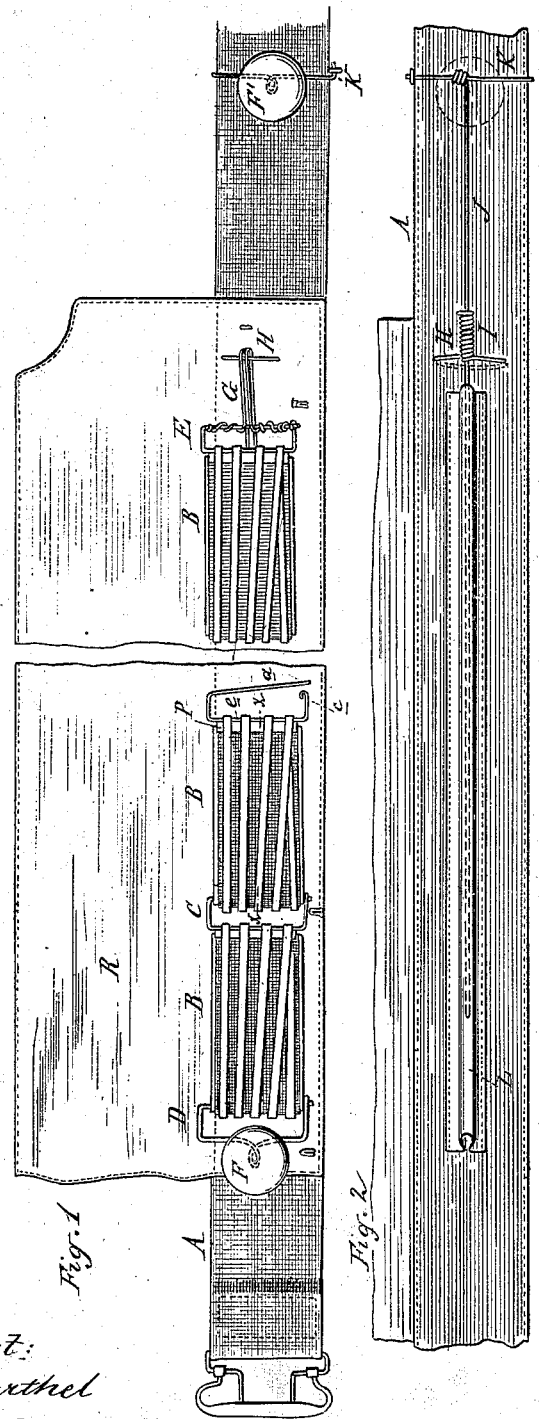
Attest:
A. Barthel
E. Scully.
Inventor:
Arthur A. Baldwin
by Thos. S. Sprague
Atty

UNITED STATES PATENT OFFICE.

ARTHUR A. BALDWIN, OF IONIA, MICHIGAN.

GALVANIC BELT.

SPECIFICATION forming part of Letters Patent No. 254,789, dated March 14, 1882.

Application filed July 27, 1881. (No model.)

*To all whom it may concern:*

Be it known that I, ARTHUR A. BALDWIN, of Ionia, county of Ionia, and State of Michigan, have invented an Improvement in Electric Galvanic Belts, of which the following is a specification.

My invention relates to electric belts which are worn about the body as a means of supplying the same with electricity as a curative agent, the battery of which consists of a number of connected links composed of zinc, copper, and absorbent fabric or other equivalent materials, each link constituting a complete and perfect galvanic battery in itself.

My invention has for its object certain improvements in the construction of link-batteries, whereby an increase of the quantity and tension of the electric current is effected and every possibility of breaking the current is avoided, and whereby the number of batteries can be easily increased or diminished, if currents of more or less strength are required.

It further consists in the peculiar construction, arrangement, and combination of parts, as more fully hereinafter set forth.

Figure 1 is a plan view of end links of galvanic belt unwrapped, showing connection of links. Fig. 2 is a back view of strap, showing how one electrode is made adjustable. Fig. 3 is a section on the line X X in Fig. 1, showing non-conducting strip to increase tension.

In the accompanying drawings, which form a part of this specification, A represents a strap of suitable material and proper length to be worn around the body.

B B are a number of independent electric galvanic batteries connected together by metallic hinges C. These links are all of like construction, and the first and last in the series are connected with electrodes F F', between which the current has free metallic connection. The electrode F is connected to its link by means of the metallic buckle D. The electrode F' connects with the nearest battery through means of buckle E, hook G, loop H, wire coil I, extension-wire J, and loop K. The loop E is in metallic connection with the hook G, by means of which the belt is attached to the loop H. This loop H is an integral part of the wire coil I, which is attached to the back side of the strap, as shown in Fig. 2. The wire coil I is fitted tightly around the extensible wire J, so as to hold it in position and make metallic connection therewith. The loose portion of the extensible wire J is hidden by the flexible strip L, sewed to the back of the strap. The opposite end of the extensible wire J is connected to the loop K, which latter slides freely upon the strap A, and has attached to it the electrode F'. By this manner of construction the adjustability of the electrode F' depends simply upon the length of wire J.

Each link is an independent battery for itself, and consists of the copper plate M, the absorbent material N, and zinc strip O, the absorbent material completely holding the two metals apart.

The zinc strip is wound spirally around the copper plate and the absorbent material, so as to securely hold the several parts of the battery together and to form at one end a coupling for the link C.

The hinge C, by which the batteries are connected, is made of wire bent to the form shown in Fig. 1, and can be closed or opened by engaging or disengaging the arm *a* into or from the hook *c*. This link C is permanently held by the zinc strip O, and when it is desired to connect another battery to it the arm *a* of the hinge is pushed into the loop *d* of the copper plate M and then the arm *a* is locked into loop *c*. This manner of connecting the batteries always insures metallic connection for the current without allowing the batteries to touch each other. The arm *a* of the hinge C is very firmly held from displacement by the loop *d*, into which it engages; but the arm *e* of the same is more liable of displacement, and to prevent its parting contact with the zinc plate O, or coming in contact with the copper plate M, and thereby destroying the current, a rubber strip, P, is placed in the position shown in Fig. 3.

R is a wrapper, which may be folded over the batteries.

What I claim as my invention is—

In an electric belt, and in combination with the batteries and the fixed electrode F thereof, the adjustable electrode F', loop K, extension-wire J, wire coil I, and a suitable connection between said coil and the batteries, substantially as described.

ARTHUR A. BALDWIN.

Witnesses:
H. S. SPRAGUE,
E. SCULLY.